US008985455B2

(12) United States Patent
Plagge et al.

(10) Patent No.: US 8,985,455 B2
(45) Date of Patent: Mar. 24, 2015

(54) ACTIVE TAG CODES

(71) Applicant: Microsoft Corporation, Redmond, WA (US)

(72) Inventors: Mark Plagge, Sammamish, WA (US); Prafulla Masalkar, Issaquah, WA (US); Dawson Yee, Medina, WA (US); Tommer Leyvand, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/781,444

(22) Filed: Feb. 28, 2013

(65) Prior Publication Data
US 2014/0239069 A1    Aug. 28, 2014

(51) Int. Cl.
G06F 17/00    (2006.01)
G06K 7/00     (2006.01)
G06K 7/10     (2006.01)
G06K 7/14     (2006.01)

(52) U.S. Cl.
CPC .................................... *G06K 7/1404* (2013.01)
USPC ......... 235/454; 235/375; 235/435; 235/462.1

(58) Field of Classification Search
CPC ............ G06K 7/1095; G06Q 20/3272; G06Q 20/3276
USPC ............... 235/454, 462.01–462.49, 487, 375, 235/435, 492
See application file for complete search history.

(56) References Cited

U.S. PATENT DOCUMENTS 8,348,149 B1    1/2013 Boudville
2002/0111869 A1 8/2002 Shuster et al.
2005/0005102 A1* 1/2005 Meggitt et al. ................ 713/164
(Continued)

FOREIGN PATENT DOCUMENTS

JP    2008029490 A    2/2008
JP    2008186487 A    8/2008
JP    2008263385 A    10/2008

OTHER PUBLICATIONS

Hao, et al., "COBRA: color barcode streaming for smartphone systems", Retrieved at <<http://www.cse.msu.edu/~glxing/docs/COBRA-MobiSys12.pdf>>, Proceedings of the 10th international conference on Mobile systems, applications, and services, Jun. 25, 2012, pp. 13.

(Continued)

*Primary Examiner* — Michael G Lee
*Assistant Examiner* — Laura Gudorf
(74) *Attorney, Agent, or Firm* — Aaron Chatterjee; Kate Drakos; Micky Minhas

(57) ABSTRACT

Embodiments are disclosed herein that relate to the use of active tag codes that change as a function of time to incorporate a greater amount of data into the tag code compared to a static tag code of similar configuration. For example, one disclosed embodiment provides a method of presenting an active tag code to a receiving device. The method includes presenting a first portion of the active tag code at a first time, the first portion of the active tag code encoding a first subset of information of a set of information encoded in the active tag code. The method further includes presenting a second portion of the active tag code at a second, later time, the second portion of the active tag code encoding a second subset of information of the set of information encoded in the active tag code.

18 Claims, 8 Drawing Sheets

(56) References Cited

U.S. PATENT DOCUMENTS

| | | | |
|---|---|---|---|
| 2006/0116853 A1* | 6/2006 | Rappaport et al. | 702/182 |
| 2007/0006275 A1* | 1/2007 | Wright et al. | 725/133 |
| 2009/0020609 A1 | 1/2009 | Cohen et al. | |
| 2011/0000958 A1* | 1/2011 | Herzig | 235/375 |
| 2011/0220719 A1 | 9/2011 | Ogawa et al. | |
| 2011/0258121 A1* | 10/2011 | Kauniskangas et al. | 705/67 |
| 2012/0292392 A1 | 11/2012 | Kim | |
| 2013/0020393 A1 | 1/2013 | Hwang et al. | |

OTHER PUBLICATIONS

Garrett, Jay., "Acoustic Barcodes—the audio QR Codes of the future", Retrieved at <<http://gadgetynews.com/acoustic-barcodes-audio-qr-codes-of-future/>>, Oct. 15, 2012, pp. 4.

Bodnar, et al., "Improving Barcode Detection with Combination of Simple Detectors", Retrieved at <<http://www.inf.u-szeged.hu/ipcg/publications/papers/4911a300.pdf>>, International Conference on Signal Image Technology and Internet Based Systems (SITIS), Nov. 25, 2012, pp. 7.

Tahaee, et al., "Project—Consumer Awareness App", Retrieved at <<http://www.uio.no/studier/emner/matnat/ifi/INF5261/h12/project-groups/consumer-awareness/midtermreport.pdf>>, In the Final Report INF5261, Feb. 4, 2013, pp. 14.

ISA European Patent Office, International Search Report & Written Opinion for Patent Application No. PCT/US2014/018128, Aug. 18, 2014, WIPO, 14 pages.

* cited by examiner

ACTIVE TAG CODES

BACKGROUND

Tag codes, such as bar codes, QR codes, and the like, are broadly used in consumer markets, manufacturing scenarios, and other settings for providing information regarding a product, wherein the information may be obtained by electronically reading the tag code for that product and locating the information associated with that tag code. However, tag codes may hold a limited amount of information, based upon a size of the tag code and density of data features (e.g. squares, rectangles, etc.) of the tag code. Further, in light of the small physical size of common tag codes, the tag may be difficult to read unless placed in close proximity to a scanning sensor. The use of a high resolution scanner, such as a high definition camera or a laser scanner, may help to overcome difficulties with reading tag codes from a distance. However, such devices may be highly engineered and expensive.

SUMMARY

Embodiments are disclosed herein that relate to the use of active tag codes that change as a function of time to incorporate a greater amount of data compared to a static tag code of similar configuration. For example, one disclosed embodiment provides a method of presenting an active tag code to a receiving device. The method includes presenting a first portion of the active tag code at a first time, the first portion of the active tag code encoding a first subset of information of a set of information encoded in the active tag code. The method further includes presenting a second portion of the active tag code at a second, later time, the second portion of the active tag code encoding a second subset of information of the set of information encoded in the active tag code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
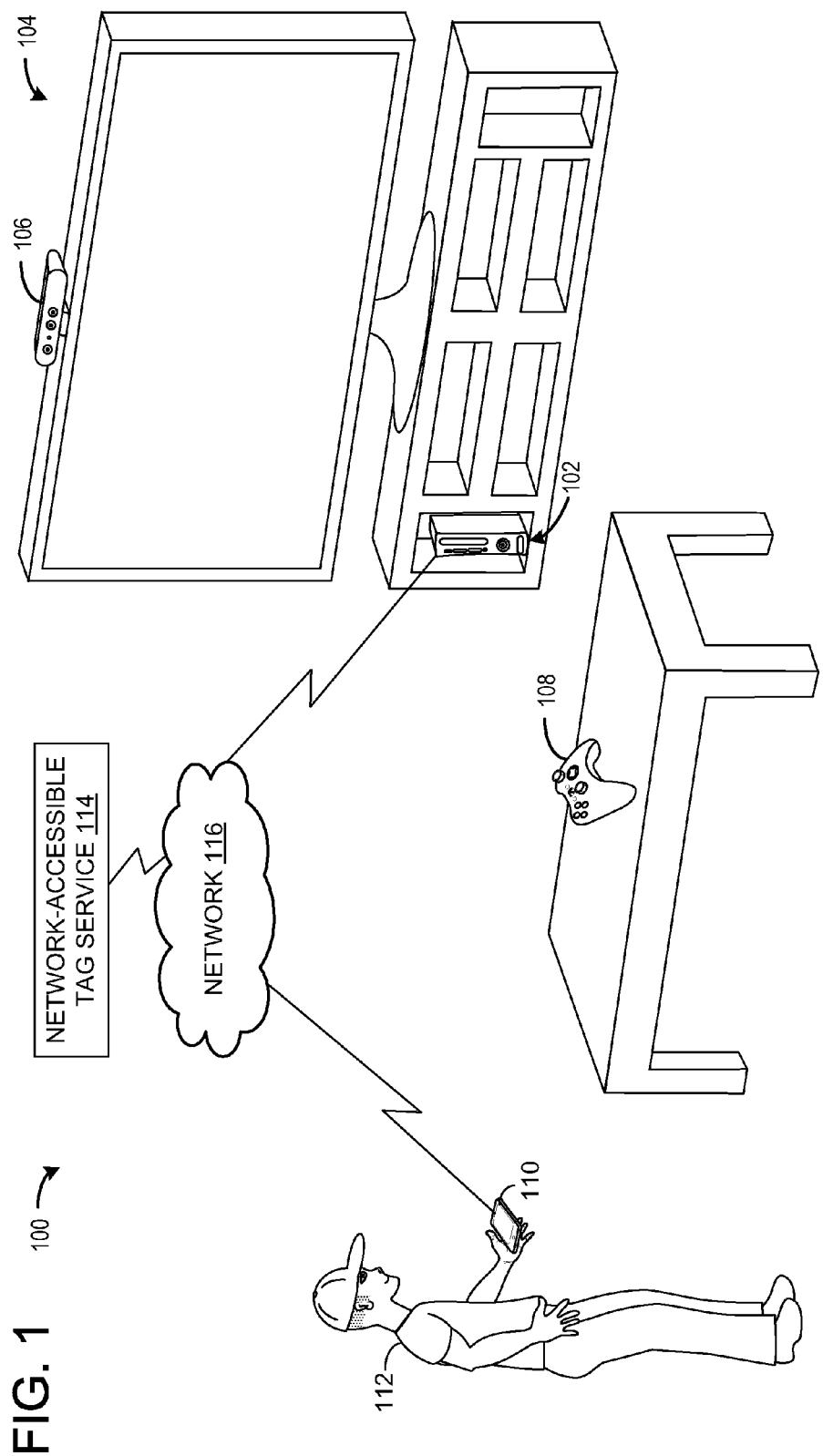
FIG. 1 shows an example use environment for utilizing an active tag code in accordance with an embodiment of the present disclosure.

As mentioned above, tag codes may be subject to various limitations. For example, tag codes may hold a limited amount of information, based upon a size of the tag code and density of data features of the tag code. Also, in light of the small physical size of common tag codes, a tag code may be difficult to read unless placed in close proximity to a scanning sensor.

Accordingly, embodiments are disclosed herein that relate to active tag codes that change as a function of time. Thus, an amount of information encoded by such a tag code may be increased by increasing a number of different data frames (image and/or audio, depending upon a type of tag) presented to a receiving device, rather than by increasing a density of features on any one static view of the tag code. This may allow data features on a displayed image of an active tag code to be maintained at a sufficient size to be readable at a relatively far distance from an image sensor without the use of a high-resolution sensor.

An active tag code according to the present disclosure may be used in any suitable use environment. For example, in some embodiments, an active tag code may be used in setting up a first computing device via a second computing device having a more convenient text entry mechanism. Some computing devices, such as video game consoles, may utilize relatively slow text entry methods, such as the selection of characters from a displayed virtual keyboard via a directional pad controller. Thus, entering device setup information, such as user account information, wireless settings, and the like, may be slow.

Accordingly, a user may enter this information on a second device with a less cumbersome text entry mechanism (e.g. software keyboard displayed on a touch-sensitive display, hardware keyboard, etc.), and then present via the second device an active tag that encodes this information, such that the active tag code may be received by input sensors (image sensors, microphones, etc.) utilized by the video game console. The use of an active tag code may allow the user to present the tag to the input sensors of the video game console from a relatively long distance, e.g. while sitting on a sofa across the room from the input sensors, due to the use of larger data features than a static tag encoding a comparable amount of data. As described below, an active tag code also may be used to facilitate the purchasing of content for the video game console, and/or other transactions. It will be appreciated that these example use scenarios are intended to be illustrative and not limiting, as active data tags may be used in any other setting to present any suitable information to any suitable receiving device. Examples of other use environments for active tag codes include, but are not limited to, manufacturing settings, business setting, and other consumer settings. The terms "presenting device" and "receiving device" may be used herein to represent devices that respectively present and receive/detect an active tag code.

FIG. 1 shows an example use environment 100 for utilizing an active tag code according to an embodiment of the present disclosure. The use environment 100 includes a receiving device 102 in the form of a gaming console. The receiving device 102 may be communicatively connected with other devices, such as a display device 104 for displaying images output by the first computing device 102, and a sensor system 106 for receiving inputs. The sensor system 106 may comprise any suitable sensors, including but not limited to one or more depth cameras, one or more two-dimensional cameras, and/or one or more microphones. The receiving device 102 may also receive input from a hand-held user input device 108. The hand-held user input device 108 is depicted as a game controller, but it will be understood that the receiving device 102 may be configured to receive user inputs from any other suitable type of input device.

The use environment 100 also includes a presenting device 110 operated by a user 112. The presenting device 110 is depicted as a smart phone, but it will be understood that any other suitable presenting device may be used, including but not limited to a tablet computer, notepad computer, laptop computer, a desktop computer, etc. As mentioned above, the presenting device may have a more convenient text entry mechanism (e.g. a software keyboard displayed on a touch-sensitive display) than the receiving device 102, which may utilize a directional controller on hand-held input device 108 to interact with a keyboard displayed on display device 104.

The receiving device 102 and the presenting device 110 are depicted as communicating with a network-accessible tag service 114 via a network 116 (e.g. a computer network and/or a cellular phone network). The network-accessible tag service 114 may be used to generate an active tag code based upon user inputs made via the presenting device 110, and to send the active tag code to the presenting device 110 for presentation to the receiving device 102. The receiving device 102, upon receiving the active tag via sensor system 106 and decoding the active tag code, may contact the network-accessible tag service 114 to verify the active tag code. In some embodiments, an active tag code may be retired by the network-accessible tag service after verification such that the same active tag code is not used for future transactions, while in other embodiments the tag may be reused. In yet other embodiments, the receiving device 102 and the presenting device 110 may not utilize a network-accessible tag service. Instead, the presenting device may locally generate the active tag code.

Figure 2:
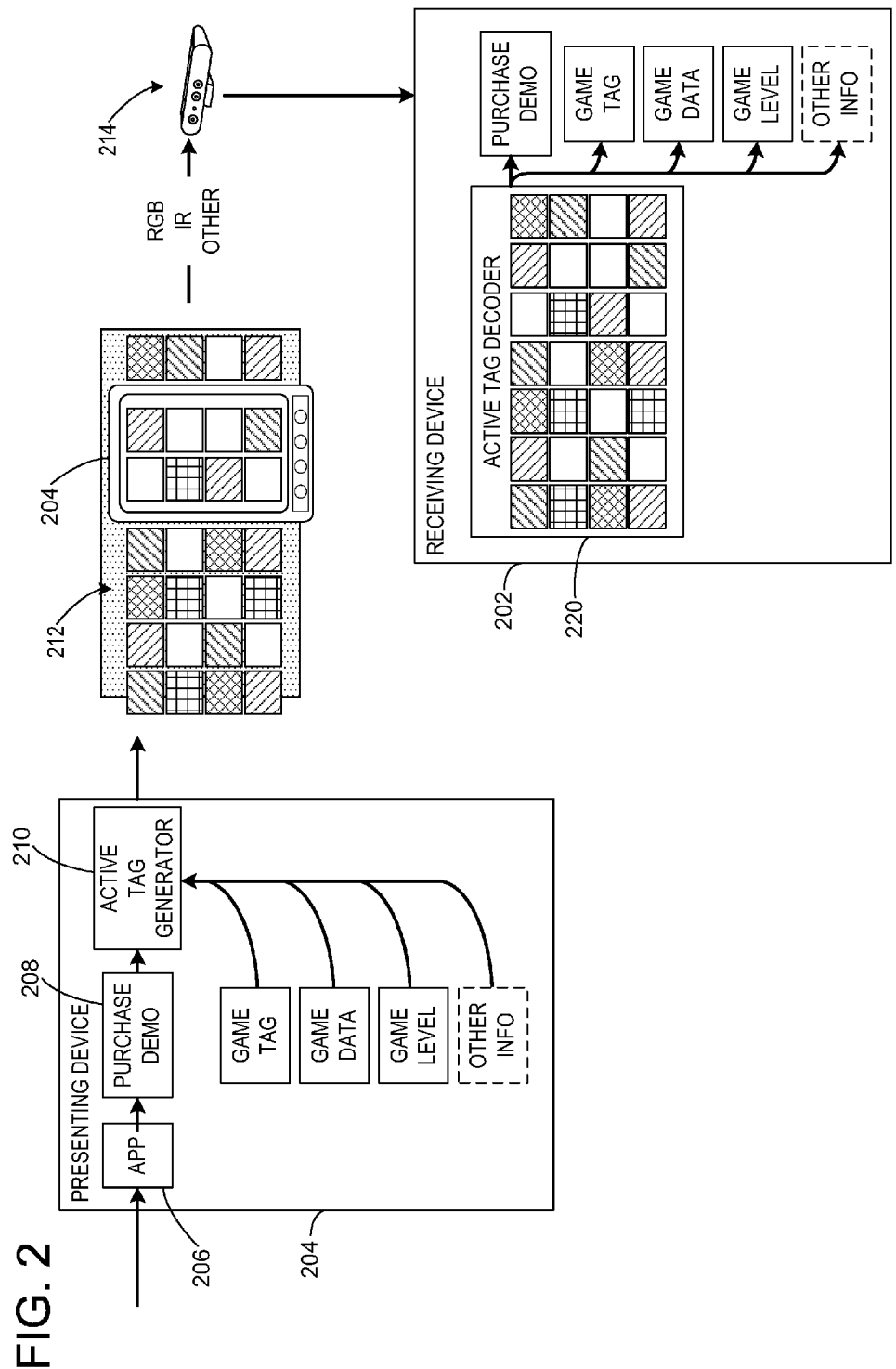
FIG. 2 shows a block diagram illustrating the generation and display of an active tag code according to an embodiment of the present disclosure.

FIG. 2 illustrates a schematic depiction of another example use scenario in which an active tag may be used to communicate information between computing devices. More specifically, FIG. 2 illustrates an example transaction in which a game demo is purchased for a receiving device 202, such as a game console, via user inputs made at a presenting device 204, such as a mobile device.

Figure 3:
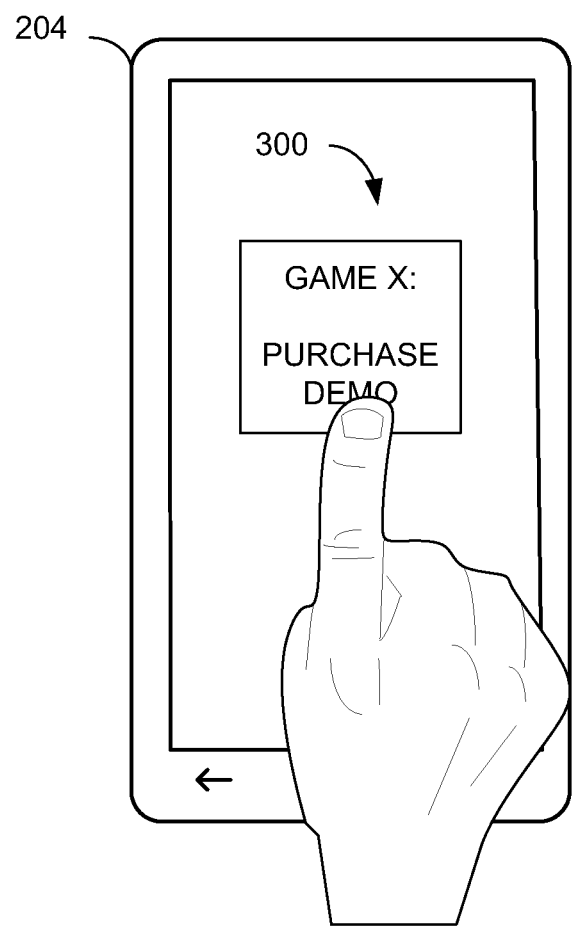
FIG. 3 shows an embodiment of a user interface of the mobile device of FIG. 2 for receiving an input configured to trigger generation of an active tag code.
Figure 5B:
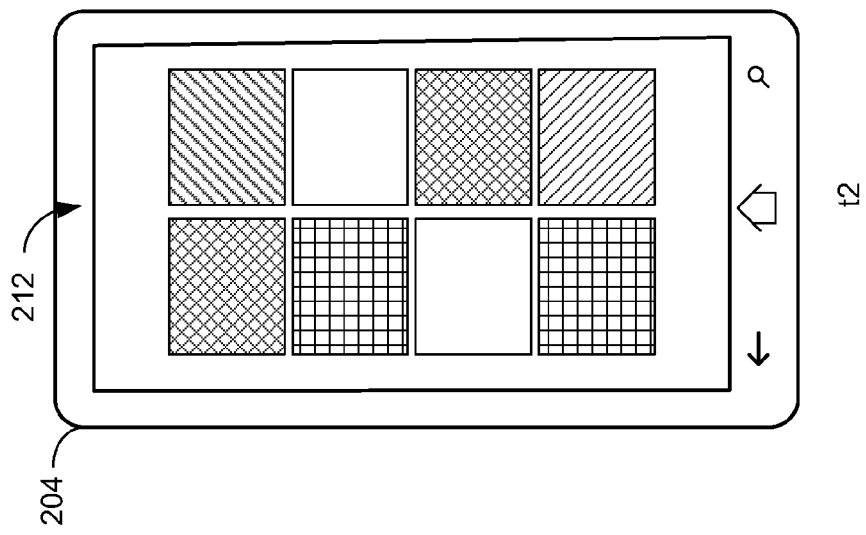
FIGS. 5A-5D shows example representations of a series of frames of an active tag code displayed on the mobile device in accordance with an embodiment of the present disclosure.
Figure 5A:
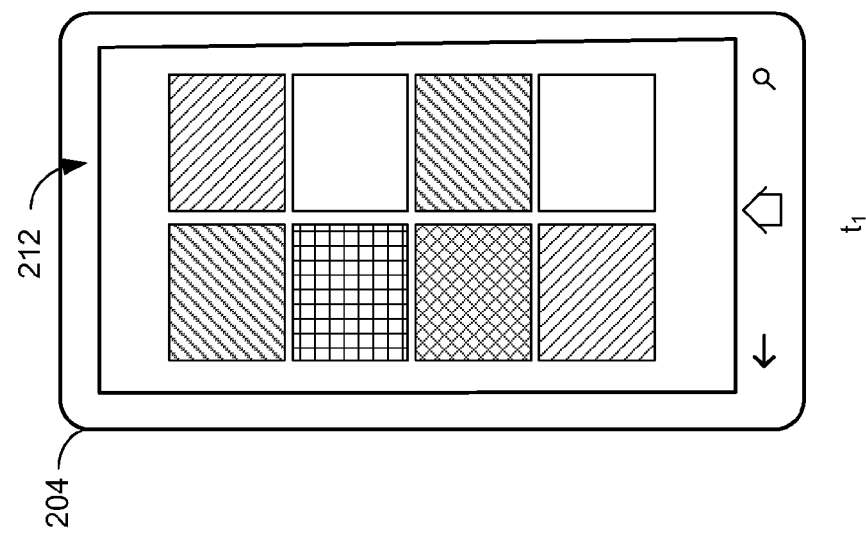

First, a user of the presenting device 204 may run an application 206 on the presenting device that allows the user to browse games playable on the receiving device 202. The user may decide that a particular game looks interesting, but before purchasing a full version of the game, the user may wish to purchase an inexpensive demo of the game. Thus, rather than using the receiving device 202 to again search for the demo for purchase, the user may generate an active tag on the presenting device 204 for presentation to the receiving device 202. FIG. 3 shows an example mobile device user interface 300 for triggering the generation of an active tag, in the form of a confirmation screen for purchasing a demo version of "GAME X."

Referring again to FIG. 2, upon requesting the purchase of the demo version of GAME X at 208, an active tag generator 210 may assemble various data for encoding in the active tag. For example, as depicted, information such as a gamer tag (e.g. a user account identification), game data information (e.g. an identification of the game of interest), game level information (e.g. a specific level of the game that the user wishes to play), and other information related to the purchased demo and/or user may be assembled by the active tag generator. It will be understood that the information depicted in FIG. 2 as being included in an active tag is presented for the purpose of example and is not intended to be limiting in any manner, as any other suitable information may be used for the depicted transaction. It will further be understood that active tags used for other transactions may encode any other suitable information, and that the encoded information may be obtained in any suitable manner (e.g. via user input, from local or remote storage, etc.).

FIG. 2 also shows a schematic depiction of an embodiment of an active tag 212 generated by the active tag generator 210. The active tag 212 comprises a plurality of data features, which are illustrated in FIG. 2 as squares of different appearances (e.g. different colors, different patterns, etc.). While the depicted squares are of equal size, data features of unequal size and/or unequal shape also may be used. In various embodiments, each data feature may represent one bit (e.g. where data features have binary appearances), or multiple bits of information. It will be understood that any suitable number of and combination of data features may be used in an active tag, and that data features may take any suitable form.

FIG. 2 also depicts a schematic representation of the presenting device 204 (in the form of a mobile device) displaying a portion of the active tag 212. Due to the number and size of the data features, not all data features of the active tag 212 may be displayed on the presenting device 204 at any time. Therefore, the presenting device 204 may display different portions of the active tag at different times to communicate all of the data features of the active tag 212 to the receiving device 202.

Figure 4:
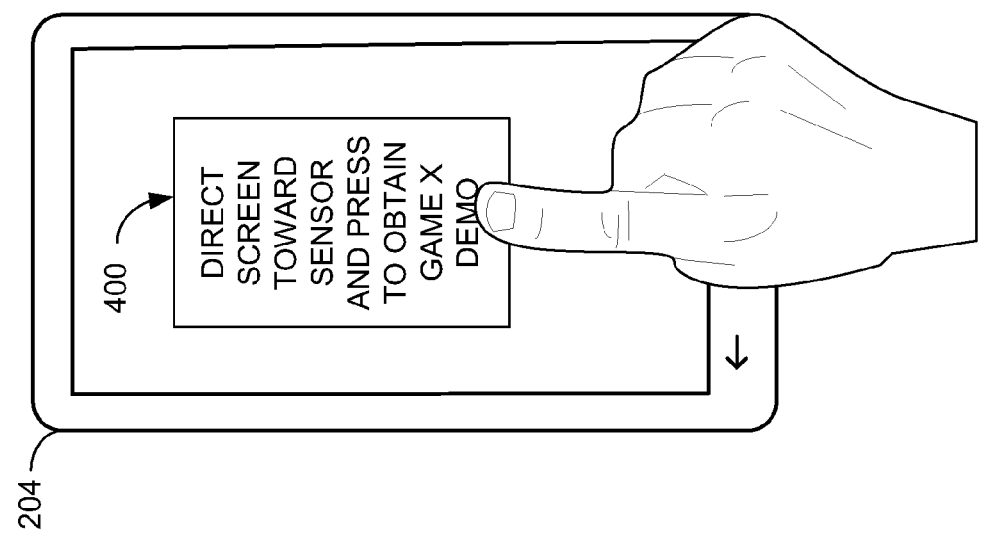
FIG. 4 shows an embodiment of a user interface of the mobile device of FIG. 2 for triggering presentation of an active tag code.
Figure 5D:
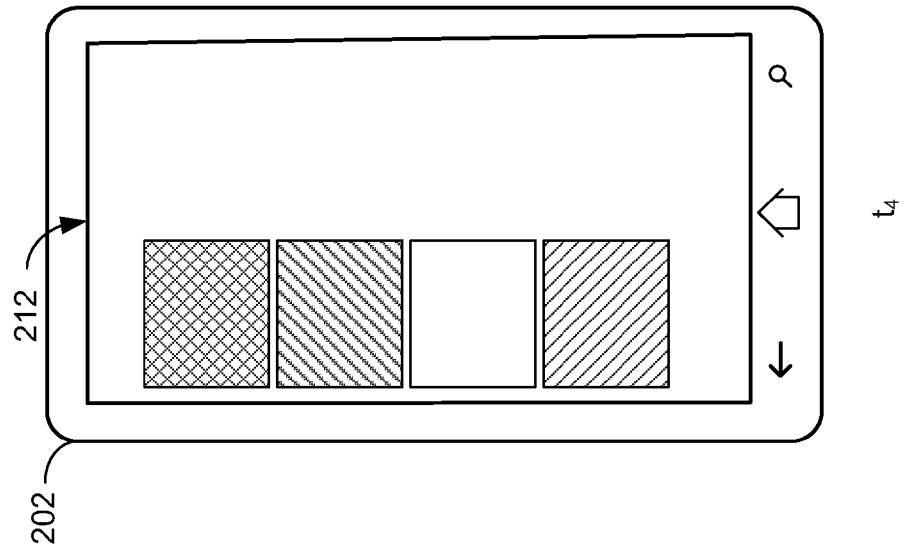
Figure 5C:
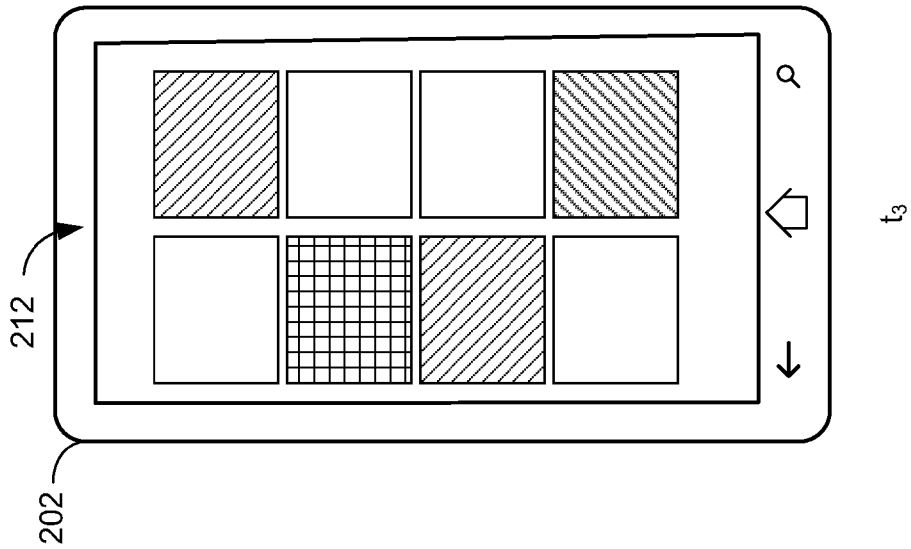

A user may present the active tag to the console 202 by directing the display of the presenting device 204 toward a sensor system 214 used as an input device for the receiving device 202. FIG. 4 shows an example embodiment of a user interface control 400 configured to trigger presentation of the active tag, and FIGS. 5a-5d illustrate the display of active tag 212 via the presenting device 204. In FIGS. 5a-5d, the data features of the active tag 212 are displayed in portions beginning with the two left-most columns at time $t_1$ and then proceeding to the right. Each portion of the active tag 212 may be displayed for any suitable duration, depending, for example, upon a frame rate of a sensor used to sense the presentation of the active tag 212. FIG. 2 depicts the active tag as being sensed via the sensor system 106 of FIG. 1, and shows that the tag may be displayed as a series of color or grayscale images (e.g. a series of video images), infrared images, and/or may be presented in any other suitable form, such as partially or fully in audio form. It will be understood that portions of an active tag may be presented in any suitable arrangement and order.

Continuing, FIG. 2 also shows an active tag decoder module 220 executed by the receiving device 202. The active tag decoder module 220 receives the image data from the sensor to recover the full active tag code, extracts the portions of the active tag from the received image data, and decodes the active tag portions to obtain the information encoded in the active tag code.

In some embodiments, a user may interact with the receiving device 202 prior to presentation of the active tag to alert the console that the active tag code will be transmitted, while in other embodiments such an alert may be omitted. It will further be understood that the embodiments of FIGS. 2-4 and 5a-5d are presented for the purpose of example, and are not intended to be limiting, as an active tag may be presented in any suitable form, may encode any suitable information, and may be used in any suitable use environment and/or scenario.

Figure 6:
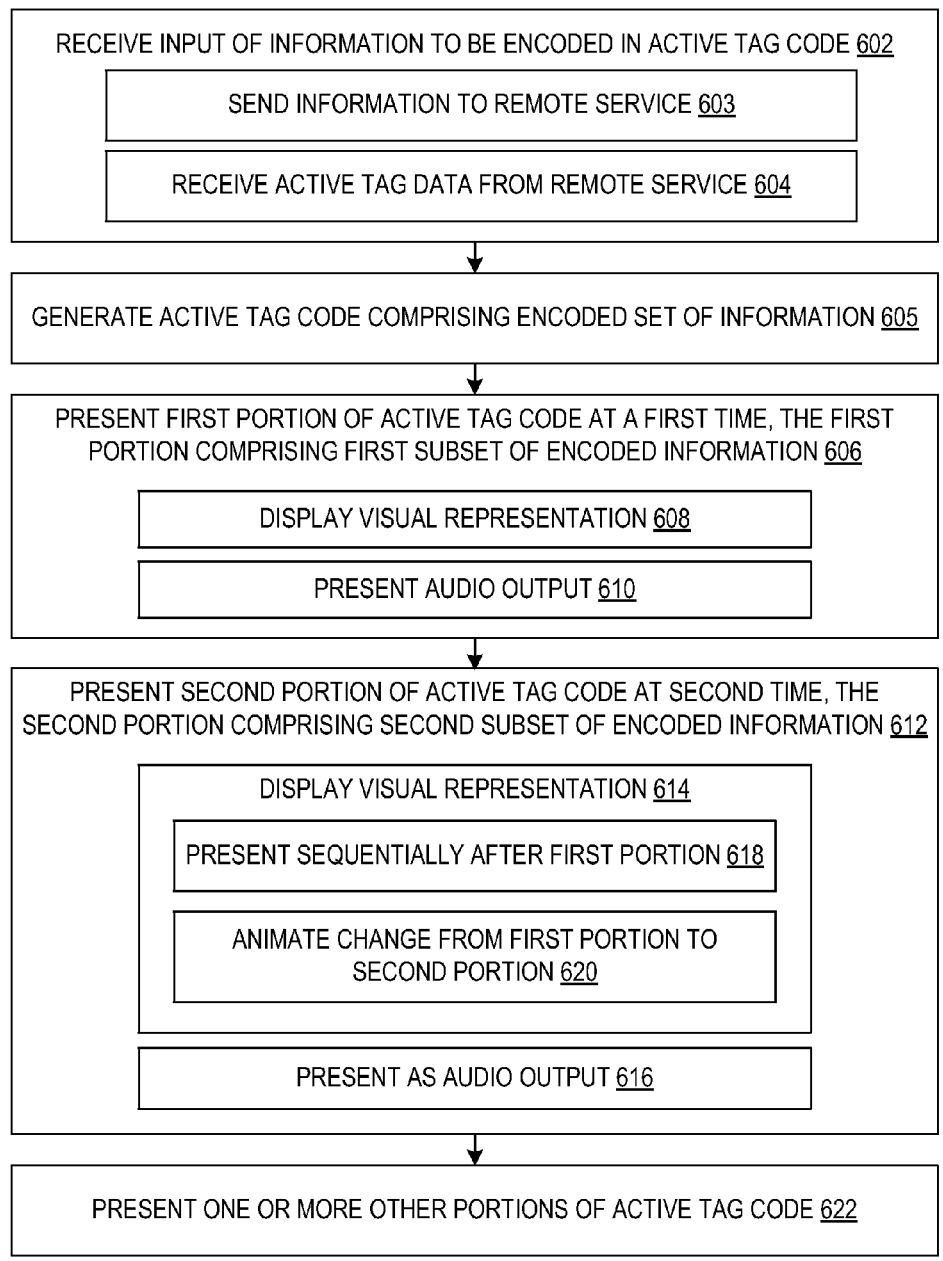
FIG. 6 shows a flow diagram depicting an embodiment of a method for presenting an active tag code to a receiving device.

FIG. 6 shows an embodiment of a method 600 for presenting an active tag to a receiving device. It will be understood that method 600 may be implemented via computer-readable instructions stored on a storage device and executed by a logic subsystem on a computing device. Method 600 comprises, at 602, receiving an input of information to be encoded in an active tag code. For example, a user may input a selection of a content item that the user wishes to obtain (e.g. a game, application, video, audio, and/or other content item), may input information for setting up another computing device (e.g. account information, wireless settings information), may input payment information to pay for a selected content item, and/or may input any other suitable information configured to be encoded in or otherwise trigger the generation of active tag data (e.g. a level of a requested game). In some embodiments, the user-input information may be sent to a remote service, as indicated at 603, and active tag data related to the user information may be received from the remote service, as indicated at 604. In other embodiments, the user-input information may be used to generate active tag data locally.

Method 600 further comprises, at 605, generating an active tag code comprising an encoded set of information including the user-input information and/or any other suitable information, depending upon a nature of a transaction to be performed via the active tag. The active tag code may be encoded as image data and/or audio data in various embodiments, and may have both image and audio portions. After generating the active tag code, method 600 comprises, at 606, presenting a representation of the first portion of the active tag code at a first time, wherein the first portion of the active tag code comprises a first subset of the set of information encoded by the overall active tag code. The first portion of the active tag code may be presented in any suitable manner. For example, as indicated at 608, a visual representation of the active tag code may be displayed via a display device positioned to be detectable by a receiving image sensor. Further, as indicated at 610, an audio representation may be presented as an audio output. In some embodiments, an active tag code may have both visual and audio representations. It will be understood that the term "visual representation" represents a presentation made via any suitable wavelength of electromagnetic energy, including visible and infrared wavelengths.

Continuing, method 600 next comprises, at 612, presenting a second portion of the active tag code at a second time, wherein the second portion comprises a second subset of the set of information. As mentioned above for the first portion, the second portion may be displayed as a visual representation 614, and/or may be presented as an audio output 616. Where a visual representation is presented, the image displayed may transition from the first to the second portion in any manner. For example, as indicated at 618, the first and second portions may be presented sequentially, such that the transition between the display of the first and second portions is abrupt. In other embodiments, as indicated at 620, a transition between the first and second portions may be animated, for example, by scrolling, fading, and/or other suitable transition.

Depending upon how much data is encoded by the active tag code and a density of data encoded in each portion of the active tag code, the active tag code may have additional portions for presentation, and potentially a significant number of additional portions. As such, method 600 comprises, at 622, presenting one or more other portions of the active tag code. In this manner, the entirety of the active tag code may be presented to the receiving device.

Figure 7:
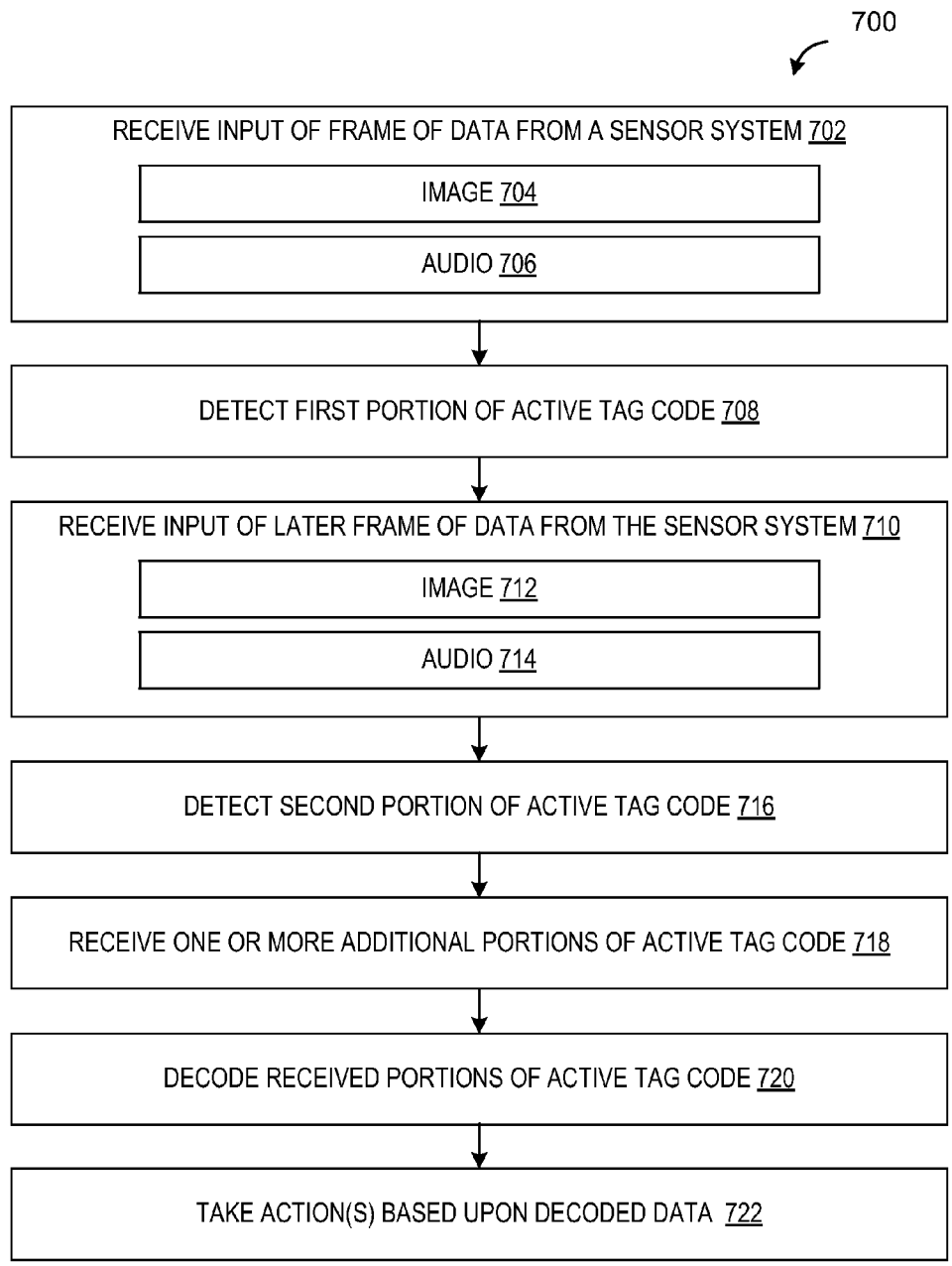
FIG. 7 shows a flow diagram depicting an embodiment of a method for detecting and decoding an active tag at a receiving device.

FIG. 7 shows an embodiment of a method 700 of receiving an active tag code. It will be understood that method 700 may be implemented via computer-readable instructions stored on a storage device and executed by a logic subsystem on a computing device. Method 700 comprises, at 702, receiving an input of a frame of data from a sensor system. The frame of data may comprise a frame of image data 704 (e.g. video sensor data and/or depth image data), and/or may comprise a frame of audio data 706. In some embodiments, a device performing method 700 may have been alerted previously to prepare for receipt of an active tag, while in other embodiments no such alert may precede receipt of an active tag.

Method 700 next comprises, at 708, detecting a first portion of an active tag code in the frame of data. For example, where the frame of data comprises image data, the first portion of the active tag code may be detected as an image of the code portion displayed on a display screen of a device, such as a mobile device or other suitable computing device, imaged in the image data. Likewise, where the frame of data comprises audio data, the first portion of the active tag code may be detected, for example, based upon one or more audio signals (e.g. tones or a combination of tones, audible or inaudible to the human ear) that trigger a code receiving and reading process and/or signify a frame of audio data. It will be understood that these examples are intended to be illustrative and not limiting in any manner.

Method 700 next comprises, at 710, receiving an input of a later frame of data from the sensor system, wherein the later frame of data may comprise image data 712 and/or audio data 714, and detecting a second portion of an active tag code in the later frame of data, at 716. As mentioned above, the first portion and the second portion of the active tag code respectively comprise first and second subsets of a set of information encoded by the overall active tag code. Method 700 further may comprise receiving additional portions of the active tag code, depending upon how many frames of data are encoded in the active tag code.

Method 700 additionally comprises, at 720, decoding received portions of the active tag code. Decoding may be performed in any suitable manner. For example, in some embodiments, decoding may be performed once all portions of the active tag code have been received, while in other embodiments decoding may be performed continuously as the active tag code portions are received (e.g. such that decoding commences before all portions of the tag code have been received), depending upon the particular coding methods used.

After decoding the active tag code, method 700 comprises, at 722, taking an action based upon the decoded data. Any suitable action may be taken, depending upon a particular transaction for which the active tag was used. For example, where the active tag is presented to trigger a purchase and/or acquisition of content on the receiving computing device, the action(s) taken in response to the decoded data may include acquiring the content, e.g. by obtaining the content via a remote content service. Likewise, where the active tag is presented to set up the receiving computing device (e.g. as part of an out-of-box experience, to set up a new user account on a device, etc.), the action(s) taken in response may comprise contacting a remote service to authenticate the device and/or user, to associate the user with the device, etc. It will be understood that these actions are described for the purpose of example, and are not intended to be limiting in any manner.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
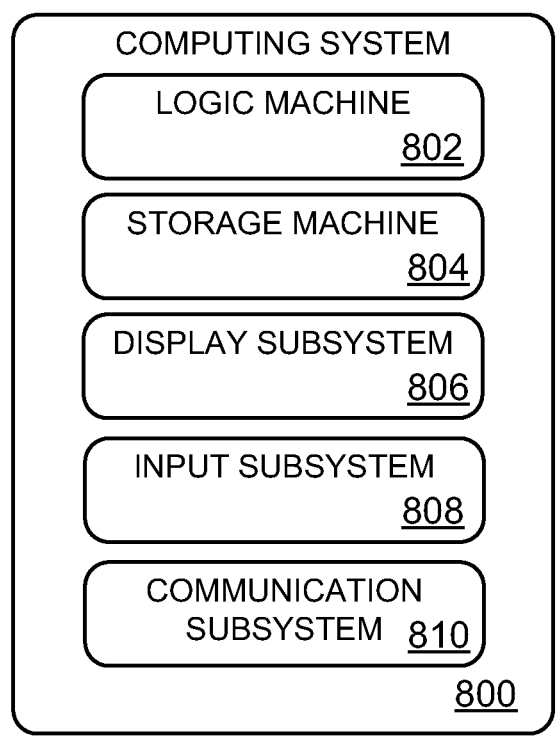
FIG. 8 shows an embodiment of a computing device.

FIG. 8 schematically shows a non-limiting embodiment of a computing system 800 that can enact one or more of the methods and processes described above. The computing system 800 is shown in simplified form. The computing system 800 may take the form of one or more gaming consoles, mobile communication devices (e.g., smart phone), mobile computing devices, tablet computers, server computers, home-entertainment computers, network computing devices, personal computers, sensor systems, and/or other computing devices.

The computing system 800 includes a logic machine 802 and a storage machine 804. The computing system 800 may optionally include a display subsystem 806, an input subsystem 808, a communication subsystem 810, and/or other components not shown in FIG. 8.

The logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 802 may include one or more processors configured to execute software instructions. Additionally or alternatively, the logic machine 802 may include one or more hardware or firmware logic machines configured to execute hardware or firmware instructions. Processors of the logic machine 802 may be single-core or multi-core, and the instructions executed thereon may be configured for sequential, parallel, and/or distributed processing. Individual components of the logic machine 802 optionally may be distributed among two or more separate devices, which may be remotely located and/or configured for coordinated processing. Aspects of the logic machine 802 may be virtualized and executed by remotely accessible, networked computing devices configured in a cloud-computing configuration.

The storage machine 804 includes one or more physical devices configured to store and hold instructions (e.g., computer-readable instructions) executable by the logic machine 802 to implement the methods and processes described herein. For example, the logic machine 802 may be in operative communication with a sensor interface (e.g. an interface of the sensor system 106 of FIG. 1), and the storage machine 804. When such methods and processes are implemented, the state of the storage machine 804 may be transformed—e.g., to hold different data.

The storage machine 804 may include removable and/or built-in devices. The storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that the storage machine 804 includes one or more physical devices. However, aspects of the instructions described herein alternatively may be propagated by a communication medium (e.g., an electromagnetic signal, an optical signal, etc.).

Aspects of the logic machine 802 and the storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, the display subsystem 806 may be used to present a visual representation of data held by the storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. The display subsystem 806 may include one or more display devices utilizing virtually any type of technology. Such display devices may be combined with the logic machine 802 and/or the storage machine 804 in a shared enclosure, or such display devices may be peripheral display devices.

When included, the input subsystem 808 may comprise or interface with one or more user-input devices such as a touch screen, keyboard, mouse, microphone, or game controller. For example, the input subsystem may include or interface with the first computing device 102 and/or the second computing device 110 of FIG. 1. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, the communication subsystem 810 may be configured to communicatively couple the computing system 800 with one or more other computing devices. The communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow the computing system 800 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a mobile computing device, a method of conducting a transaction in which a game is obtained for a game console, the method comprising:
   sending information including an identification of the game and a user identification to a remote service;
   receiving an active tag code from the remote service, the active tag code encoding the identification of the game and the user identification;
   presenting a first portion of the active tag code to a sensor system communicatively connected with the game console at a first time, the first portion of the active tag code encoding a first subset of information of a set of information encoded in the active tag code; and
   presenting a second portion of the active tag code to the sensor system at a second, later time, the second portion of the active tag code encoding a second subset of information of the set of information encoded in the active tag code.

2. The method of claim 1, wherein the presenting the first portion and the second portion of the active tag code comprises displaying visual representations of the first portion and the second portion on a display.

3. The method of claim 2, wherein presenting the visual representations of the first portion and the second portion of the active tag code comprises presenting the visual representations sequentially.

4. The method of claim 2, wherein presenting the visual representations of the first portion and the second portion of the active tag code comprises animating a transition between the first portion and the second portion.

5. The method of claim 2, wherein displaying the visual representations of the first and second portion on the display comprises displaying the visual representations on a mobile device display.

6. The method of claim 1, wherein presenting the first portion and the second portion of the active tag code comprises presenting the first portion and the second portion as audio outputs.

7. The method of claim 1, further comprising presenting one or more other portions of the active tag code in addition to presenting the first portion and the second portion.

8. The method of claim 1, further comprising, before presenting the first portion and the second portion of the active tag code, receiving a user input of information for inclusion in the active tag code, and generating the active tag code at least partially based upon the user input.

9. The method of claim 8, wherein the user input of information comprises one or more of the user identification, the game identification, and a specified game level.

10. A game console, comprising:
    a logic subsystem configured to execute computer-readable instructions; and
    a storage subsystem holding instructions executable by the logic subsystem to:
       receive an input of a frame of audio and/or image data from a sensor system capturing information presented by a mobile computing device;
       detect in the frame of audio and/or image data a first portion of an active tag code, the active tag code generated by a remote service based on user-input information including an identification of a game to be obtained for the game console;
       receive an input of a later frame of audio and/or image data from the sensor system;
       detect in the later frame of audio and/or image data a second portion of the active tag code;
       decode the first portion and the second portion of the active tag code to obtain respectively a first subset of a set of information encoded by the active tag code and a second subset of a set of information encoded by the active tag code, the set of information including the identification of the game; and
       obtain the game identified in the set of information.

11. The game console of claim 10, wherein the first portion and the second portion of the active tag code comprise visual representations of the first portion and the second portion displayed on a display of the mobile computing device.

12. The game console of claim 10, wherein the first portion and the second portion of the active tag code comprise audio representations of the first portion and the second portion.

13. The game console of claim 10, wherein the instructions are executable to receive, detect and decode one or more other additional portions of the active tag code.

14. On a mobile computing device comprising a display, a method of conducting a transaction in which a game is purchased for a game console, the method comprising:
    receiving an input of user information to be encoded in an active tag code, the input including an identification of the game;
    generating the active tag code, the active tag code comprising a set of information including the user information;
    displaying a visual representation of a first portion of the active tag code on the display to a sensor system communicatively connected with the game console, the first portion of the active tag code encoding a first subset of the set of information; and
    after displaying the visual representation of the first portion of the active tag code, displaying a visual representation of a second portion of the active tag code to the sensor system, the second portion of the active tag code encoding a second subset of the set of information.

15. The method of claim 14, wherein presenting the visual representations of the first portion and the second portion of the active tag code comprises presenting the visual representations sequentially.

16. The method of claim 14, wherein presenting the visual representations of the first portion and the second portion of the active tag code comprises animating a transition between the first portion and the second portion.

17. The method of claim 14, further comprising encoding a portion of the set of information as an audio portion of the active tag, and presenting the audio portion of the active tag.

18. The method of claim 14, further comprising presenting one or more additional portions of the active tag code.

* * * * *